(12) United States Patent
Robertson, Jr.

(10) Patent No.: US 8,215,875 B2
(45) Date of Patent: *Jul. 10, 2012

(54) BOLT ANCHOR

(76) Inventor: Roy Lee Robertson, Jr., Delbarton, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,196

(22) Filed: May 20, 2011

(65) Prior Publication Data

US 2011/0229273 A1 Sep. 22, 2011

Related U.S. Application Data

(63) Continuation of application No. 12/538,035, filed on Aug. 7, 2009, now Pat. No. 7,959,379.

(60) Provisional application No. 61/156,669, filed on Mar. 2, 2009.

(51) Int. Cl.
*E21D 21/00* (2006.01)

(52) U.S. Cl. ............... 405/259.4; 405/302.1; 405/259.1; 411/60.2; 411/71

(58) Field of Classification Search ............... 405/259.1, 405/259.4, 288, 302.1; 411/60.1, 60.2, 60.3, 411/71, 72, 49, 50
See application file for complete search history.

(56) References Cited

U.S. PATENT DOCUMENTS

| | | |
|---|---|---|
| 3,188,815 A | 6/1965 | Schuermann et al. |
| 3,938,420 A | 2/1976 | Draa |
| 3,941,028 A | 3/1976 | Lobello et al. |
| 4,162,133 A | 7/1979 | Clark et al. |
| 4,173,918 A | 11/1979 | Piersall |
| 4,194,858 A | 3/1980 | Evans |
| 4,289,426 A | 9/1981 | Chaiko |
| 4,293,244 A | 10/1981 | Donan, Jr. |
| 4,299,515 A | 11/1981 | Yates et al. |
| 4,334,805 A | 6/1982 | Morgan |
| 4,380,407 A | 4/1983 | Donan, Jr. |
| 4,413,930 A | 11/1983 | Calandra, Jr. |
| 4,419,805 A | 12/1983 | Calandra, Jr. |
| 4,453,845 A | 6/1984 | Donan et al. |
| RE31,776 E | 12/1984 | Clark et al. |
| 4,516,883 A | 5/1985 | Zeitler |
| 4,516,885 A | 5/1985 | Calandra, Jr. |
| 4,516,886 A | 5/1985 | Wright |
| 4,518,292 A | 5/1985 | Calandra, Jr. |
| 4,534,679 A | 8/1985 | White et al. |
| 4,557,631 A | 12/1985 | Donan, Jr. et al. |
| 4,592,687 A | 6/1986 | Piersall |
| 4,664,561 A | 5/1987 | Frease |
| 4,764,055 A | 8/1988 | Clark et al. |

(Continued)

*Primary Examiner* — Frederick L Lagman
(74) *Attorney, Agent, or Firm* — Robert R. Waters; Brian W. Foxworth; Waters Law Group, PLLC

(57) ABSTRACT

A bolt anchor is comprised of a body and sleeve. The body is generally wedge shaped with a threaded bore along its axis and at least one stop near its smaller end. The sleeve has a round collar with leaves extending from the collar parallel to the axis of the collar and each other. The at least one stop maintains the assembly of the body and sleeve. Prongs on the sleeve prevent the retraction or turning of the bolt anchor when a bolt is installed in a hole using the bolt anchor. Reduced material thickness associated with the leaves on the sleeve produces hinges which allow the leaves to be more easily deformed outwardly to engage the sides of a hole. Inserting a bolt and bolt anchor assembly into the hole and then turning the bolt pulls the body into the sleeve and creates a wedging effect in the hole.

18 Claims, 4 Drawing Sheets

U.S. PATENT DOCUMENTS

| | | | |
|---|---|---|---|
| 4,904,123 A | 2/1990 | Calandra, Jr. | |
| 4,913,593 A | 4/1990 | Clark et al. | |
| 4,969,778 A | 11/1990 | Calandra, Jr. | |
| 5,009,549 A * | 4/1991 | Stankus | 405/259.4 |
| 5,011,337 A | 4/1991 | Clark et al. | |
| 5,033,910 A | 7/1991 | Wright | |
| 5,052,861 A | 10/1991 | Hipkins, Sr. | |
| 5,064,312 A | 11/1991 | Calandra, Jr. | |
| 5,073,065 A | 12/1991 | Kleineke | |
| 5,076,734 A | 12/1991 | Hipkins, Sr. | |
| 5,078,547 A | 1/1992 | Calandra, Jr. | |
| 5,094,577 A | 3/1992 | Clark et al. | |
| 5,181,800 A * | 1/1993 | Stankus et al. | 405/259.5 |
| 5,232,311 A * | 8/1993 | Stankus | 405/259.4 |
| 5,244,314 A | 9/1993 | Calandra, Jr. | |
| 5,352,066 A | 10/1994 | Schaeffer et al. | |
| 5,441,372 A | 8/1995 | Wilkinson | |
| 5,599,140 A * | 2/1997 | Wright | 405/259.4 |
| 5,762,451 A | 6/1998 | Stankus et al. | |
| 5,846,041 A | 12/1998 | Bevan et al. | |
| 6,599,059 B2 | 7/2003 | Calandra, Jr. | |
| 6,742,966 B2 | 6/2004 | Cook | |
| 6,986,623 B2 | 1/2006 | Robertson, Jr. | |
| 7,179,020 B2 | 2/2007 | Robertson, Jr. | |
| 7,959,379 B2 * | 6/2011 | Robertson, Jr. | 405/259.4 |
| 2002/0094240 A1 * | 7/2002 | Cook | 405/259.4 |
| 2004/0191004 A1 | 9/2004 | Cook | |

* cited by examiner

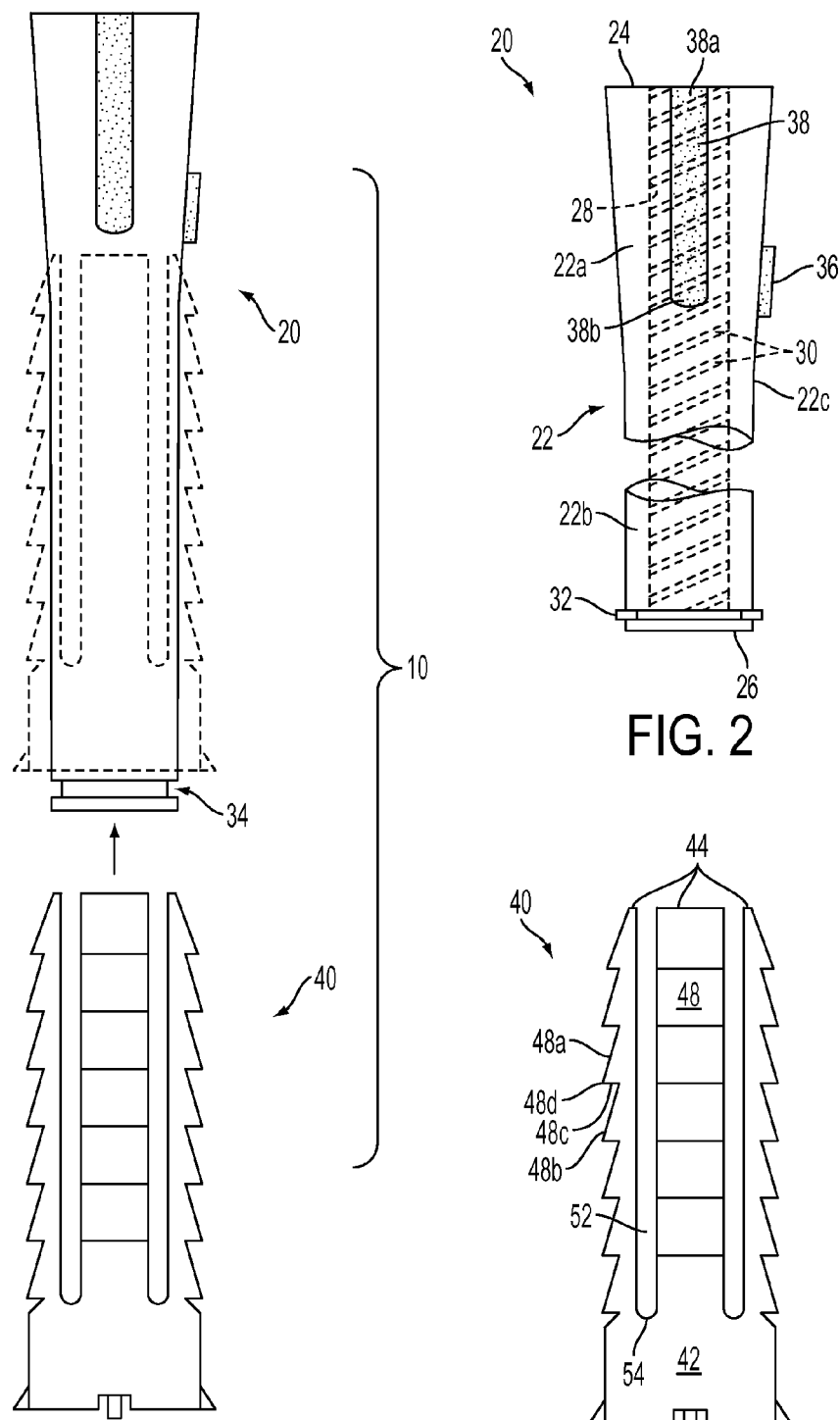

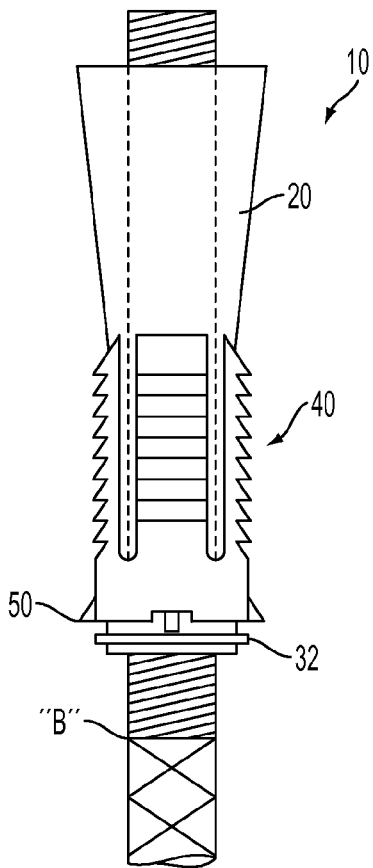
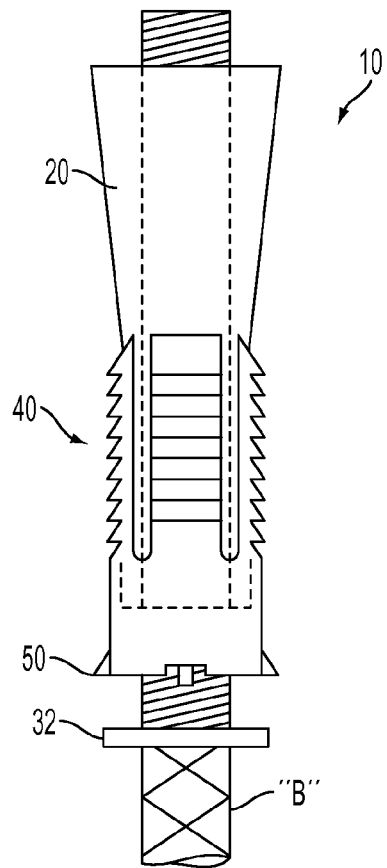
FIG. 4    FIG. 5
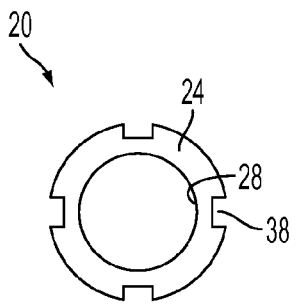
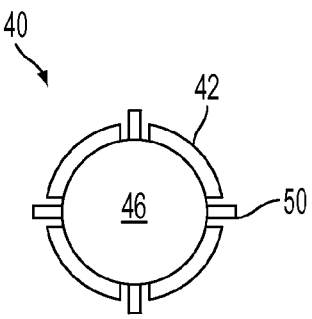
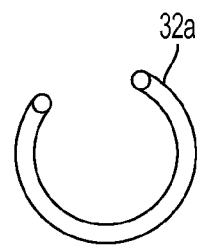
FIG. 6    FIG. 7    FIG. 8

BOLT ANCHOR

RELATED U.S. APPLICATION DATA

This application is a Continuation of U.S. patent application Ser. 12/538,035, filed on Aug. 7, 2009, which issued as U.S. Pat. No. 7,959,379. It therefore claims priority from U.S. pat. No. 7,959,379, which in turn claims priority from U.S. Provisional Application 61/156,669, filed on Mar. 2, 2009. The entire disclosures contained in U.S. patent application Ser. 12/538,035, now issued as U.S. Pat. No. 7,959,379, and U.S. Provisional Application 61/156,669, including the attachments thereto, are incorporated herein by reference.

BACKGROUND

Certain embodiments of the invention pertain to a bolt anchor. This application includes embodiments and claims pertaining to a bolt anchor having two communicating portions, the first portion communicating within the second portion, and in response, the second portion outwardly deforms to secure the bolt anchor within a hole or bore.

Of the several applications for bolt anchors, one is in mines. Mine shafts sometimes experience cave-ins, collapses, or falling rock due to the layered and stratified makeup of the earth. A mine shaft itself may cause fractures and weaknesses in a strata in its ceiling, or it may just expose an inherently weak and unstable layer. To assist in preserving the integrity of the ceiling, it is common to support the ceiling with bolts anchored up rock layers above the ceiling. Plates between the bolt heads on the exposed ends of the bolts and the ceilings are used to transfer force from the anchored bolts to the exposed layer of the ceiling. In some applications, the exposed end of the anchored bolt is threaded. Onto these bolts, a nut is threaded, and the nut is used to place a preload on the bolt to set an initial lifting force to the plates.

Holes, which are slightly oversized to the bolts, are drilled into the ceiling. Sometimes the holes must be several feet deep to be sure of anchoring the bolts in a stable layer of rock. Once the holes are drilled, the bolts are inserted into the holes and anchored. There are three methods for anchoring the bolts in the holes, mechanical, adhesive, and mechanically assisted adhesive. This application relates mostly to the mechanical method or the mechanical aspect of the mechanically assisted adhesive method of anchoring bolts, so the adhesive method will be discussed only briefly before discussing the relevant mechanical art.

Once the hole is drilled, a multi-component adhesive is placed in the blind end of the hole. The components of the adhesive are kept in separate frangible packages to keep them from mixing, for once they do, a reaction occurs, and the adhesive begins to set up. The components of the adhesive are usually a hardener and a catalyst. When the frangible packages have been placed in the hole, a bolt is inserted and turned rapidly to rupture the packages and thoroughly mix the adhesive components. The adhesive is typically of a fast setting variety and may begin to set after three to five seconds of mixing. For many mechanical anchoring methods, the mechanical anchoring elements on the bolt assist in mixing the adhesive, and the increased resistance to mixing of the setting adhesive activates the mechanical anchoring system.

In mine roof applications, different methods are employed to ensure engagement of the mechanical elements of a bolt anchor. In bolt anchors, the mechanical elements frequently comprise a camming element surrounded by a wedging element. The threaded mine roof bolt draws the camming element into the wedging element to drive the wedging element out into the walls of the hole, and this produces a wedging effect between the camming element, the wedging element, and the sides of the hole. However, the wedging element must be maintained in position at least long enough for the camming element to engage it. Frequently, stops are attached to, or mounted on, the mine roof bolts. This means the stops will turn with the bolt, while the wedging element does not turn. If heat or adhesive causes the stop to seize on the wedging element, the wedging element may be twisted with the bolt degrading the effectiveness of the anchoring system. Means for maintaining the camming element and the wedging element in assembly, or contact, without reliance on a stop fixed to the bolt is necessary to avoid twisting of the anchoring elements. Several other problems such as ease of use and manufacture, and effectiveness are addressed by the several embodiments presented in this application.

DESCRIPTION OF THE RELEVANT ART

U.S. Pat. No. 4,194,858 by Evans, titled Mine roof bolt anchor installation, is for a mine roof bolt anchoring apparatus. A coil spring having fixedly attached washer members at each end encircles a mine roof bolt and is retained between radially projecting ears on the bolt and an expansion anchor threaded on the bolt. The washer member which engages the bolt ears is slotted to receive the ears so that rotation of the bolt is transmitted to the spring and the other washer member. The washer member at the other end has a pair of stepped shoulders on the face opposite the spring which engages the lower end of the anchor shell. The latter is also provided with a pair of stepped shoulders which cooperate with those on the washer member to transmit rotation from the bolt to the anchor in one direction and allow relative rotation in the other. In this manner, a resin grouting cartridge placed in the drill hole ahead of the anchor may be broken and its contents mixed by rotation of the bolt and anchor as a common unit, and the anchor expanded to tension the bolt as the resin sets by rotation in the opposite direction.

U.S. Pat. No. 4,299,515 by Yates, et al., titled Rock reinforcement system, is for a mine roof bolt anchoring apparatus. A system for reinforcing a rock formation, such as in mining or tunneling operations, wherein an elongated bolt is anchored in a blind drill hole in the rock formation by both a mechanical expansion anchor and a resin grouting mix. The invention is particularly directed to novel means which prevent relative rotation of the bolt and anchor in one direction and allow relative rotation in the opposite direction, whereby a conventional, two-compartment resin cartridge can be broken and its contents mixed while rotating the bolt and anchor in the first direction, and the anchor expanded to tension the bolt by reversing the direction of rotation before the resin mix hardens. The novel means comprise a collar element which is affixed to the end of the bolt above the expansion anchor and cooperatively engages a stop means on the anchor in only one direction of bolt rotation. A number of alternative means are disclosed for affixing the collar to the bolt.

U.S. Pat. No. 5,441,372 by Wilkinson, titled Rock bolt shell and cone, is for a shell for a rock bolt with a cone threadedly engaged thereto and other claims. An expansible shell has a cylindrical outer surface and raised ridges in relief on the exterior of the shell. One or more ridges are located along a curve non-congruent with a circumferential circle of the cylinder. In a disclosed embodiment, each ridge lies along a helix of the cylinder and ridges are paired such that the helix of a first extends in one rotational direction while the curve of a second of the pair extends in the other rotational direction. Each helix forms an angle of forty-five degrees with a center line of the cylinder. Ridges intersect such that "V"-shaped projections extend along the outside of the shell. The vertices of certain of the projections project a radially maximum amount while each of the legs of the "V" taper radially inwardly toward the cylindrical surface as the leg extends away from the vertex. The cone, threaded for installation on a bolt rod has one or more axial indentations to improve grout flow about an installed bolt.

U.S. Pat. No. 4,592,687 by Piersall, titled Roof Bolt, discloses an expansion bolt that has an elongated stud with a proximal and a distal end. The stud has a coaxially mounted sleeve and a nut at the distal end. An annular backing plate is carried on the stud between the sleeve and the nut. The backing plate essentially comprises of two annular disks with same inner radii, but different outer radii. The disks are joined together along their planar surfaces so that the same-sized annuli form a common bore. The first, smaller disk faces the proximal end of the stud, toward the sleeve, and the second, larger disk, faces the distal end of the stud, toward the nut. When a pre-determined torque is applied, this nut is advanced axially toward the stud, bringing the nut into engagement with the backing plate. The nut acts as a stop. In some embodiments, this backing plate may be welded in place on the stud, and a nut is not needed. The backing plate restrains the sleeve from axial movement along the stud, while allowing free rotational movement of the stud relative to the sleeve.

SUMMARY

In one embodiment, a bolt anchor comprises a body comprises an axial bore and threads disposed therein, the body terminating at opposing ends, the ends having different diameters. The body may further include a stop depending from the end having the smaller diameter. The anchor includes a deformable sleeve receiving the body, the sleeve comprising a plurality of cleats formed on the circumference of the sleeve.

In another embodiment, a bolt anchor comprises a body comprising an axial bore and threads disposed therein, the body terminating at opposing ends, the ends having different diameters. A stop depends from the end having the smaller diameter. A deformable sleeve is provided and may receive the body, wherein the sleeve comprises a collar and a plurality of leaves depending from the collar, an axial void defined by the leaves and the collar, and a plurality of cleats formed on the circumference of the sleeve.

In another embodiment, a mining roof bolt system is described, the system comprising a bolt that comprises external threads, and a body comprising an axial bore and threads disposed therein, the body terminating at opposing ends, the ends having different diameters. A stop depends from the end having the smaller diameter. A deformable sleeve is provided, the sleeve receiving the body, the sleeve comprising a plurality of cleats formed on the circumference of the sleeve.

In another embodiment, a mining roof bolt system is described, the system comprising a bolt comprising external threads. A body comprising an axial bore and threads disposed therein is provided, the body terminating at opposing ends, the ends having different diameters. A stop depends from the end having the smaller diameter. A deformable sleeve receiving the body is provided, the sleeve comprising a collar and a plurality of leaves depending from the collar, an axial void defined by the collar and the leaves, and a plurality of cleats formed on the circumference of the sleeve.

BRIEF DESCRIPTION OF THE DRAWINGS

FIG. 1 is an exploded view of a bolt anchor comprising a body and a sleeve, the sleeve depicted in phantom engaging body.

FIG. 2 is a front or side view of one embodiment of the body.

FIG. 3 is a front or side view of one embodiment of the sleeve.

FIG. 4 is a front or side view of one embodiment of the bolt anchor coupled to a bolt "B".

FIG. 5 is a front or side view of another embodiment of the bolt anchor coupled to a bolt "B".

FIG. 6 is top view of the body depicting the recesses 38 and axial bore 28.

FIG. 7 is a bottom view of the sleeve depicting the prongs 50 and the axis void 46 formed therethrough.

FIG. 8 is a top or bottom view of a clip ring 32a.

DESCRIPTION OF THE EMBODIMENTS

Figure 10:
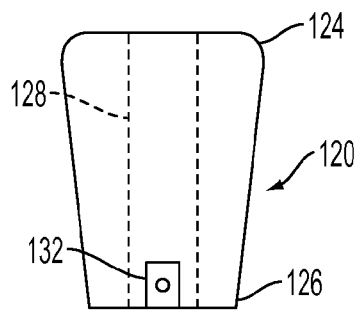
FIG. 10 is a front view of another embodiment of the body of the bolt anchor.

Referring now to FIG. 1 through FIG. 4 and FIG. 6 through FIG. 8, one embodiment of the invention comprises a bolt anchor that is depicted and generally denoted by the reference character 10. The bolt anchor 10 is utilized for securing anchoring a bolt "B" within a hole of a roof, wall, floor or other similar surface into which a bolt "B" may be inserted. The bolt anchor 10 comprises a body 20 and a deformable sleeve 40. The body 20 comprises a generally tapered surface. The sleeve 40 engages the body 20, wherein the sleeve 40 communicates along the exterior surface of the body 20. In response to relative downward movement of the body 20 along bolt "B", the sleeve 40 engages the increasingly wider surface of the body 20, outwardly deforming the sleeve 40 and securing the anchor 10 and bolt "B" into position within the hole of the roof, wall, floor or other surface.

The body 20 comprises a shaft 22 terminating at an end 24 and an end 26, the ends 24 and 26 disposed opposite thereof. The ends 24 and 26 having different diameters and the diameter of the shaft 22 therebetween the ends 24 and 26 may be tapered. The body 20 may further comprise an axial bore 28 having a plurality of internal threads 30. The bore 28 and threads 30 permit coupling of the body 20 with a bolt "B" having external threads thereon. The body 20 may also include a stop 32 depending from one of the ends 24 or 26.

The shaft 22 may be described as having two segments, including a tapered first segment 22a and a linearly elongated second segment 22b. The first segment 22a may be generally described as having a conical form. End 24 forms one margin of the conical form. The segments 22a and 22b interface at a junction 22c. The diameter of the junction 22c is generally similar or the same as the diameter of end 26, the end 26 forming one margin of the second segment 22b. Thus, the conical form of the first segment 22a may be described as having a diameter at end 24 greater than the diameter of either the junction 22c or the end 26 terminating the second segment 22b.

The second segment 22b may function as a guide for the sleeve 40. The linearly elongated form of the second segment 22b has a diameter smaller than that of the void 46 formed in sleeve 40 (described in more detail below). Thus, the second segment 22b may guide the sleeve 40 (via void 46) into communication and/or engagement with the first segment 22a and its conical form.

The stop 32 depends from one of the ends 24 or 26. In but one example, depicted in FIG. 2 and FIG. 4, the stop 32 depends from end 26. In one embodiment, the stop 32 is an integral element formed during the fabrication of the body 20. In another embodiment, the stop 32 is removable from and attachable to the body 20. In such an embodiment, the stop 32 may comprise a returnably resilient clip ring 32a that may be inserted into a groove or channel 34 formed along the exterior surface and along the outer circumference at or near the end 26 of the body 20. It is also envisioned that the stop 32 may comprise a pliable or flexible grommet or other similar device that may be positioned to depend from the end 26 or positioned within a groove or channel 34 provided for dependence from the end 26. The stop 32 may engage one or more prongs or teeth 50 disposed on and/or depending from the sleeve 40.

In another embodiment, the body 20 may further include one or more recesses 38 formed in the exterior surface of the body 20. Each recess 38 may be disposed with a terminal end 38a of the recess 38 co-extensive with a terminal end 24 or 26 of the body 20, and an opposing end 38b co-planar with the body 20. In this embodiment, the recess 38 may have a variable depth along its length, wherein the depth is greatest at or near the co-extensive end 38a and gradually decreasing to substantially no depth at or near the co-planar end 38b. Each recess 38 accommodates adhesive resins or other similar chemicals that may be used to further secure a bolt "B" within a hole. As bolt "B" is mechanically rotated within the body 22, the bolt "B" and anchor 10 mix the resin, with the resin pushed through the recess(es) 38 from the end 38b toward the end 38a.

In another embodiment, the body 20 may further include one or more fins 36 depending from the exterior surface of the body 20. Each fin 36 may be disposed along the exterior surface of the body 20 to inhibit excessive rotation of the sleeve 40 as the body 20 and sleeve 40 engage during operation. Each fin 36 may be defined by a height that is greater than the internal circumference of the sleeve 40. Each fin 36 engages the space or channel 52 formed between two leaves 44 of the sleeve 40, as described in greater detail below.

In one embodiment, the sleeve 40 comprises a collar 42 and a plurality of leaves 44 depending from the collar 42. A The collar 42 and leaves 44 define an axial void 46 within the sleeve 40, the void 46 accommodating or receiving a segment of the body 20. The space or channel 52 between leaves 44 terminates at a joint generally defined by a semi-circular cut-out 54 utilized to reduce the stress placed on the leaves 44. A plurality of cleats 48 may be disposed or formed on the outer circumference of the sleeve 40, such as along all or some portion of the vertical length of one or more of the leaves 44. The sleeve 40 may further include one or more prongs or teeth 50 depending from the circumference of the collar 42 adjacent the free terminal end of the collar 42. The prongs or teeth 50 engage the stop 32, thereby inhibiting the sleeve 40 from moving beyond a certain threshold relative to the body 20 should the leaves 44 prematurely release the body 20.

The collar 42 forms one portion of the sleeve 40. The collar 42 provides a structural support for the leaves 44 depending therefrom. As the leaves 44 outwardly deform under pressure from the body 20, the collar 42 operates to strengthen the leaves 44 and to inhibit premature failure at the junction of the collar 42 and leaves 44. The collar 42 further provides structural support for one or more prongs or teeth 50 that may depend from the sleeve 40.

Each one of the leaves 44 may be upwardly depending from the collar 42. A leaf comprises an interior surface having a radius that is complementary to the general radius and form of the body 20 (and the exterior surface of the body 20). The leaf 44 also comprises an exterior surface having a radius that is similar to the interior surface and inner radius. A plurality of cleats 48 may be formed on and/or depending from the exterior surface of the leaf 44. In one embodiment, each cleat 48 may be formed and/or disposed in a similar manner, providing uniformity to the gripping surface that the leaf 44 and cleat(s) 48 provide. For example, as depicted in FIG. 3, the cleats 48 are serially arranged having a surface 48a, a surface 48b and a surface intermediately disposed between surfaces 48a and 48b. Surfaces 48a and 48b may be substantially similar in configuration, sharing similar dimensions (e.g. length, width, surface area and angle from the leaf 44). Surface 48c interconnects the surfaces 48a and 48b, generally deflected at or approximately at a right) (90° angle to the surfaces 48a and 48b, respectively. This arrangement is repeated along the surface of the leaf 44. The outermost surface of the arrangement, generally denoted by the reference character 48d, provides a generally pointed surface that may be used to embed the leaves 44 into surrounding material, including wood, metal, plastic, soil, rock, chemical adhesive or a combination thereof, among several possibilities and combinations. In such an embodiment, as the leaves 44 of sleeve 40 outwardly deform, the surface 48d of one cleat 48 may embed, impinge or otherwise engage with the surrounding material to provide rigid anchoring of the anchor 10.

In another embodiment, each cleat 48 may be formed and/or disposed in different ways. For example, a plurality of tines or spines may be provided in place of the surfaces 48a-48d described above. The tines or spines may outwardly project so as to provide a way to embed, impinge, pierce or burrow into the surrounding material.

If provided, each one of the prongs or teeth 50 may outwardly project from the surface of the collar 42 at an angle incident to the surface of the collar 42. The prongs or teeth 50 extend the relative circumference or diameter of the sleeve 40 (and collar 42) and provide a way by which the stop 32 of body 20 may engage and inhibit the sleeve 40 from completely disengaging from the body 20 during installation or operation.

As depicted in FIG. 1 and FIG. 4, a bolt anchor 10 is depicted, and may be utilized in a variety of applications. By way of example only, one such application includes the use of an anchor 10 in an underground mineral mining environment, such as an underground coal mine. In this example, an anchor 10 comprises a body 20 is threadably coupled to a threaded bolt "B" that forms part of the roof-bolt system (roof-bolt and roof-plate) commonly employed in underground mining to provide structural integrity to the roof-top above the working miners. The body 20 is engaged by a deformable sleeve 40. The body 20 comprises a tapered form, with a generally conical form at one end and a linearly elongated form at the opposing end, and having a stop 32 at a terminal end 26. The sleeve 40 comprises a collar 42 and a plurality of upwardly depending leaves 44, wherein each leaf 44 comprises a plurality of cleats 48 having surfaces 48a-48d. The sleeve 40 further includes a plurality of prongs 50 that may engage the stop 32.

To install the bolt anchor 10 as coupled to the bolt "B", a hole is drilled into the roof top material, wherein the hole has a diameter larger than the bolt anchor 10 and bolt "B". Optionally, a resin or other chemical adhesive material is inserted into the hole. The bolt "B" is inserted through an aperture in the roof-plate. The anchor 10 is threadably coupled to the bolt "B". The bolt "B" and anchor 10 is inserted into the hole in the roof-top. The bolt "B" is mechanically rotated, causing the resin or chemical adhesive material (if used) to mix and spread through the hole, quickly creating a bonding quality within the hole and between the bolt "B", adhesive and hole. The terminal end of the bolt "B" engages the roof top, but does not substantially penetrate into the roof top material beyond the end of the hole. Against this resistance, the bolt "B" continues to rotate causing the threaded body 20 to move relatively downward along the bolt "B". Concurrently, the sleeve 40 engages the sides of the hole via the prongs or teeth 50 depending from an end of the sleeve 40. The prongs 50 provide resistance and hold the sleeve 40 in a relatively fixed position, allowing the body 20 to engage the leaves 44 of the sleeve 40. As the body 20 engages the leaves 44, by entering the void 46 defined by the collar 42 and leaves 44, and in response to the wider diameter surface provided near the top end of each leaf 44, each leaf 44 is outwardly deformed toward the sides of the hole. The cleats 48 on each leaf 44 engage the sides of the hole and provide a fixed position of the anchor 10.

FIG. 5 depicts another embodiment of the invention, wherein the stop 32 is a fixed or permanent structure on the bolt "B" body. In this embodiment, the axial length of the collar 42 (of sleeve 40) is lengthened. As the bolt "B" is mechanically rotated, the stop 32 moves relatively upward toward the end of the collar 42, and then engaging the collar 42 and urging the collar 42 upward. In so urging, the leaves 44 are outwardly deformed as each engages the progressively wider diameter of the body 20. The cleats 48 of the leaves 44 engage the sidewall of the hole and secure the bolt anchor 10 and bolt "B" in place within the hole.

Figure 9:
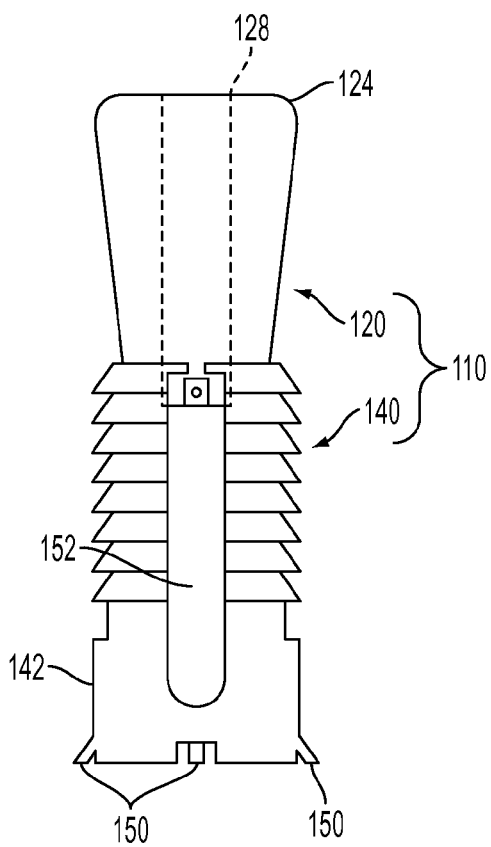
FIG. 9 shows the assembly of an embodiment of a body and an embodiment of a sleeve assembled to form an embodiment of a bolt anchor.

FIG. 9 shows an embodiment of a bolt anchor 110 comprised of the assembly of a body 120 and sleeve 140. Body 120 inserts, smaller, distal end 124 first, into the axial void defined by leaves 144 extending from collar 142 of sleeve 140. Stops 132 on body 120 engage with retention tabs 156 on the extended ends of leaves 144 to maintain assembly of body 120 and sleeve 140.

Figure 11:
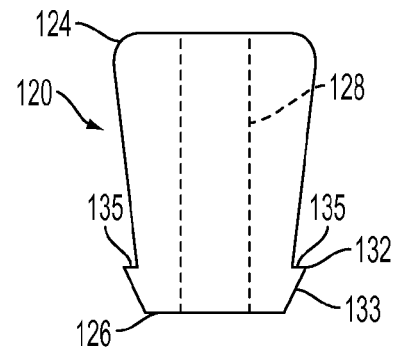
FIG. 11 is a side view of the body of the embodiment of FIG. 10.

Referring now to FIG. 10 and FIG. 11, another embodiment of a body 120 of the bolt anchor is shown. FIG. 2 is a front view of the embodiment of body 120 of the bolt anchor, while FIG. 3 is a side view of the embodiment of body 120. In the embodiment shown in FIG. 2 and FIG. 3, body 120 has a proximal end 124 and a distal end 126. Proximal end 124 of body 120 has a greater circumference than distal end 126 of body 120 and body 120 generally tapers continuously from its larger, proximal end 124 to its smaller, distal end 126. While FIG. 2 and FIG. 3 depict body 120 as being conical, body 120 could as well be pyramidal in other embodiments.

In FIG. 10, stops 132 may be seen on body 120 at, or near, smaller, distal end 126. FIG. 3 shows stops 132 extending radially from body 120. In the embodiment shown in FIG. 11, stops 132 themselves have a tapered shape with insertion face 133 of stop 132 merging with the surface of body 120 at the lower edge of insertion face 133 and expanding up and away from the surface of body 120 to the upper edge of insertion face 133 which extends out from body 120. From the upper edge of insertion face 133 to the surface of body 120 is located locking face 135. As will be described below, the tapered shape of stop 132 in the embodiment of body 120 shown in FIG. 11 assists in the assembly of body 120 and sleeve 140 of bolt anchor 110. While stops 132 in the embodiment of body 120 shown in FIG. 11 are tapered as just described, this is not necessary for all embodiments of body 120. Other embodiments may have stops extending from body 120 with essentially prismatic shapes.

Body 120 has an axial bore 128 extending from proximal end 124 to distal end 126. Axial bore 128 is indicated by dotted lines in FIGS. 9, 10, 11, and 13. Axial bore 128 has internal threads, which match the external threads of a respective mine roof bolt.

Figure 12:
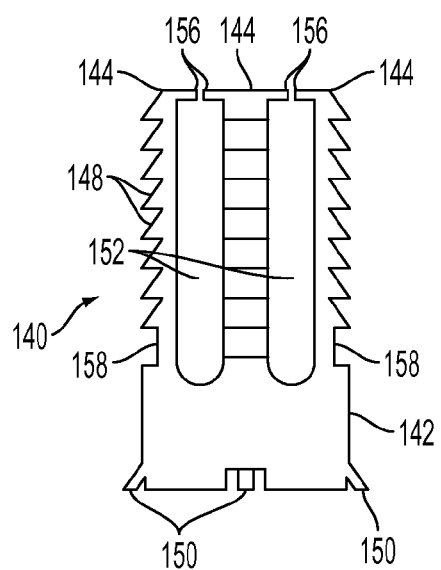
FIG. 12 is a front or side view of another embodiment of a sleeve of the bolt anchor.

FIG. 12 separately shows another embodiment of a sleeve 140 of bolt anchor 110. In its larger aspects, sleeve 140 is comprised of collar 142 with leaves 144 extending from collar 142 generally parallel to the axis of collar 142 and generally parallel to each other. Leaves 144 are located around the circumference of collar 142 with spaces or channels 152 between adjacent leaves 144.

Leaves 144 may have cleats 148 on their exterior surfaces to more securely engage the sides of a hole into which a bolt and bolt anchor 110 are inserted. Cleats 148 may have several shapes, or embodiments. The embodiment of cleats 148 shown FIG. 12 is substantially similar to the embodiment of cleats 48 shown in FIG. 3 and discussed with respect to FIG. 3. As such, the outermost surface of the arrangement provides a generally pointed surface that may be used to embed leaves 144 into surrounding material, including wood, metal, plastic, soil, rock, chemical adhesive or a combination thereof, among several possibilities and combinations. In such an embodiment, as leaves 144 of sleeve 140 outwardly deform, the outermost, pointed, surface a given cleat 148 may embed, impinge or otherwise engage with the surrounding material to secure anchoring of the anchor 110. The embodiments of cleats 48 and 148 shown in FIGS. 3 and 12 and discussed with respect to those figures are by way of example and the illustration and description of those embodiments of cleats should not be considered as requiring those specific embodiments of cleats.

At the extended ends of leaves 144 are located retention tabs 156. Retention tabs 156 extend from leaves 144 substantially closing the ends of spaces or channels 152 opposite to collar 142. FIG. 9 shows an assembled bolt anchor 110 and illustrates at least one function of retention tabs 156. When smaller, distal end 126 of body 120 is inserted into the axial void defined by leaves 144 of sleeve 140 with stops 132 aligned with channels 152, leaves 144 and retention tabs 156 yield enough to allow stops 132 to slide past retention tabs 156 and pass into channels 152. The tapered shape of the embodiment of stops shown in FIG. 11 assists stops 132 in displacing leaves 144 and retention tabs 156 outwardly to allow the passage of stops 132 into channels 152. Once stops 132 pass into channels 152, leaves 144 and retention tabs 156 return to their initial state, and retention tabs 156 move in behind locking faces 135 on stops 132 to prevent the unintentional disengagement of body 120 from sleeve 140. Once body 120 and sleeve 140 are assembled, stops 132 positioned in channels 152 prevent the relative rotation of body 120 with respect to sleeve 140.

At the base of collar 142 on sleeve 140 are prongs 150. Embodiments of prongs 150 may be seen in FIGS. 9, 12, and 13. Prongs 150 extend generally radially from collar 142 to a distance that exceeds the circumference of other elements of bolt anchor 110 in the initial assembled state of bolt anchor 110. At the outermost part of prongs 150, prongs 150 will generally create an outer circumference of anchor bolt 110 somewhat larger than the inner diameter of a hole into which bolt anchor 110, and an associated bolt, are intended to be inserted. Prongs 150 are resiliently deformable so that they flex and allow the insertion of bolt anchor 110 into a hole, but the resiliency of prongs 150 causes prongs 150 to engage the surface of the hole into which bolt anchor 110 is inserted and resist the retraction of bolt anchor 110 from the hole. Engaged prongs 150 also resist the turning of sleeve 140 and bolt anchor 110 more generally.

While the embodiment of sleeve 140 shown in FIG. 12 has prongs 150 located on the bottom edge of collar 142, prongs 150 could be located anywhere along the length sleeve 140. Prongs 150 could be located on the top edge of collar 142 of sleeve 140 and could be located on the extended ends of leaves 144. Prongs located at the top edge of collar 142 would be more centrally located, while prongs located at the extended ends of leaves 144 would provide resistance to turning and retraction closer to the initial junction of body 120 and sleeve 140.

Figure 13:
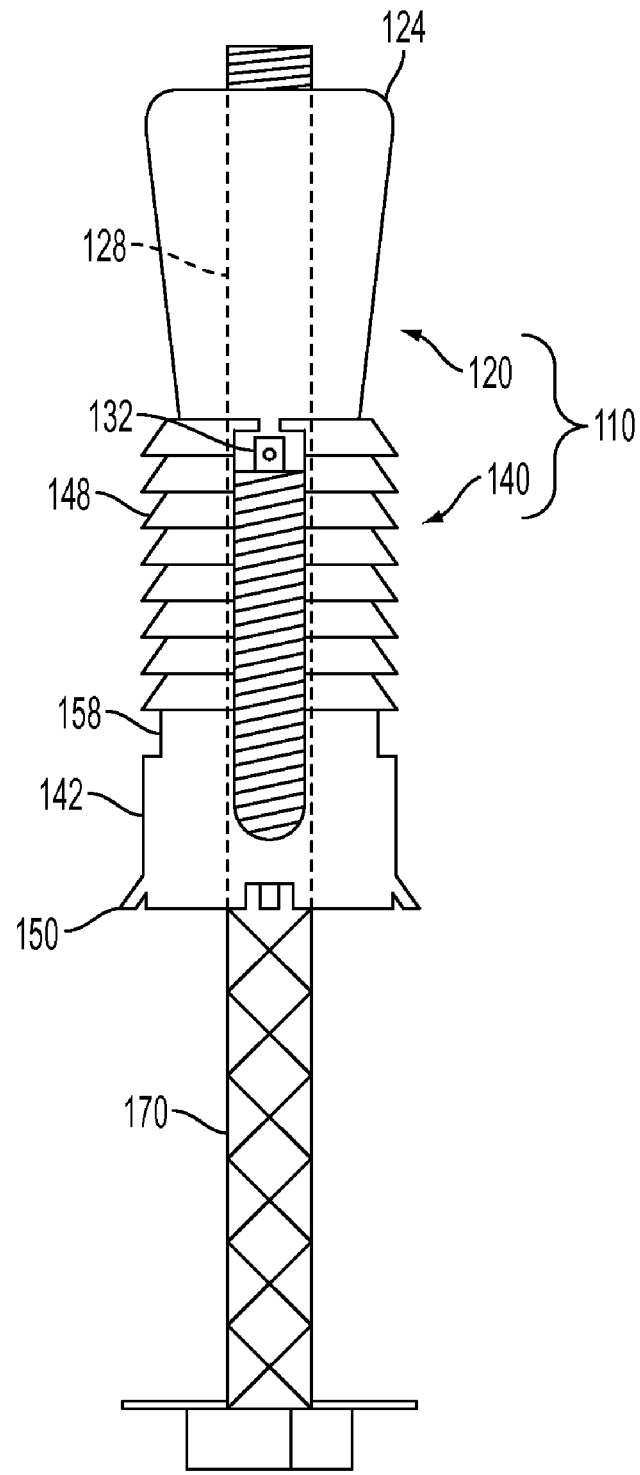
FIG. 13 shows the assembled body and sleeve of FIG. 9 with a bolt threaded into the body.

FIG. 13 shows a bolt 170 inserted through sleeve 140 and threaded into body 120 of an assembled bolt anchor 110. When the bolt anchor 110 end of the assembly of bolt 170 and bolt anchor 110 is inserted into a hole, resiliently deformable prongs 150 flex and resiliently deform to allow the insertion of the bolt 170 and bolt anchor 110 assembly into the hole. Resilient prongs 150 engage the sides of the hole and resist the retraction of the bolt 170 and bolt anchor assembly 110 and the turning of sleeve 140 and therefore the turning of bolt anchor assembly 110.

To anchor the bolt 170 and bolt anchor 110 assembly, bolt 170 is turned in the rotational direction that causes body 120 to translate along the threaded portion of bolt 170 toward sleeve 140. The head, or head and washer, on bolt 170 prevents bolt 170 from being pulled into the hole during the anchoring process. Prongs 150 on sleeve 140 prevent the rotation of sleeve 140 and body 120, ensuring relative rotation between bolt 170 and body 120 and ensuring translation of body 120 along the threaded portion of bolt 170. As body 120 moves into sleeve 140, prongs 150 also prevent the linear movement of sleeve 140, causing body 120 to move linearly with respect to sleeve 140 and move more deeply into the axial void defined by leaves 144 of sleeve 140. As body 120 moves into this axial void, the tapered shape of body 120 drives leaves 144 outward into engagement with the sides of the hole into which bolt 170 and bolt anchor 110 are located. This creates a wedging effect between body 120, leaves 144, and the sides of the hole. Tension in the bolt shaft of bolt 170 between the bolt head and body 120 maintain body 120 engaged in leaves 144 and bolt anchor 110 in the hole. When a selected torque resistance is measured in the turning of bolt 170, the installer of bolt 170 and bolt anchor 110 deems that the desired tension in bolt 170 has been reached and the installer ceases to turn bolt 170.

Another feature that sleeve 140 may have are hinges 158 located in the area where leaves 144 join collar 142. Hinges 158 are created by a reduction of thickness in the material of sleeve 140 at that location. Hinges 158 reduce the amount of force required to bend leaves 144 from the initial position of leaves 144. This reduces the amount of force needed to pull body 120 into further engagement with sleeve 140 and leaves 144 and thus reduces the amount of rotational force needed to be applied to a bolt employing bolt anchor 110. Reducing the rotation force needed to anchor bolt anchor 110 reduces the amount of rotation force that prongs 150 must resist to prevent rotation of bolt anchor 110.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

Furthermore, the Abstract is neither intended to define the claims of the application, nor is it intended to be limiting to the scope of the claims in any way. It is intended that the application is defined by the claimed appended hereto.

What is claimed is:

1. A bolt anchor comprising:
    a body comprising an axial bore and threads disposed therein, the body terminating at opposing ends, said opposing ends being a larger, proximal end, and a smaller, distal end; and
        generally tapering from said proximal end toward said distal end;
    at least one stop depending from said body from near said distal end;
    a deformable sleeve receiving and engaging said distal end of said body, said sleeve comprising a plurality of leaves parallel to the axis of said sleeve, said sleeve having an inner circumference and an outer circumference;
    wherein said at least one stop maintains said body and said sleeve in engagement.

2. The bolt anchor of claim 1, wherein:
    said at least one stop comprises at least one radial projection from said body, said at least one radial projection extending from said body to a height greater than the inner circumference of said sleeve but no greater than the outer surface of said proximal end of said body.

3. The bolt anchor of claim 2, wherein:
    at least two adjacent said leaves of said sleeve have a gap between them sufficient to accommodate said at least one stop, said sleeve having at least one said gap per each said stop.

4. The bolt anchor of claim 3, wherein:
    said sleeve further comprises at least one retention tab at least partially spanning each said gap receiving a said stop, said at least one retention tab maintaining the receipt of said body in said sleeve.

5. The bolt anchor of claim 1, further comprising:
    at least one prong extending radially outward from the outer circumference of said sleeve, said at least one prong extending radially to a distance greater than the radius of a hole for which said bolt anchor is intended and said at least one prong being generally directed away from said proximal end of said body to allow the insertion of said bolt anchor into said hole but resist the extraction of said bolt anchor from said hole.

6. The bolt anchor of claim 5, wherein:
    said at least one prong is located near the end of said sleeve opposite to the end of said sleeve into which said body is received.

7. The bolt anchor of claim 1, further comprising:
    cleats on the outer circumference of said sleeve.

8. The bolt anchor of claim 1, further comprising:
a region of reduced material thickness at the end of said leaves opposite to the end of said sleeve into which said body is received.

9. A mining roof bolt system comprising:
a bolt comprising external threads;
a body comprising an axial bore and threads disposed therein, the body terminating at opposing ends, said opposing ends being a larger, proximal end, and a smaller, distal end; and
generally tapering from said proximal end toward said distal end;
said bolt being threaded into said body;
at least one stop depending from said body from near said distal end;
a deformable sleeve receiving and engaging said distal end of said body, said sleeve comprising a plurality of leaves parallel to the axis of said sleeve, said sleeve having an inner circumference and an outer circumference;
wherein said at least one stop maintains said body and said sleeve in engagement.

10. The mining roof bolt system of claim 9, wherein:
said at least one stop comprises at least one radial projection from said body, said at least one radial projection extending from said body to a height greater than the inner circumference of said sleeve but no greater than the outer surface of said proximal end of said body.

11. The mining roof bolt system of claim 10, wherein:
at least two adjacent said leaves of said sleeve have a gap between them sufficient to accommodate said at least one stop, said sleeve having at least one said gap per each said stop.

12. The mining roof bolt system of claim 11, wherein:
said sleeve further comprises at least one retention tab at least partially spanning each said gap receiving a said stop, said at least one retention tab maintaining the receipt of said body in said sleeve.

13. The mining roof bolt system of claim 9, further comprising:
at least one prong extending radially outward from the outer circumference of said sleeve, said at least one prong extending radially to a distance greater than the radius of a hole for which said bolt anchor is intended and said at least one prong being generally directed away from said proximal end of said body to allow the insertion of said bolt anchor into said hole but resist the extraction of said bolt anchor from said hole.

14. The mining roof bolt system of claim 13, wherein:
said at least one prong is located near the end of said sleeve opposite to the end of said sleeve into which said body is received.

15. The mining roof bolt system of claim 9, further comprising:
cleats on the outer circumference of said sleeve.

16. The mining roof bolt system of claim 9, further comprising:
a region of reduced material thickness at the end of said leaves opposite to the end of said sleeve into which said body is received.

17. A bolt anchor comprising:
a body comprising an axial bore and threads disposed therein, the body terminating at opposing ends, said opposing ends being a larger, proximal end, and a smaller, distal end; and
generally tapering from said proximal end toward said distal end;
at least one stop depending from said body from near said distal end;
a plurality of parallel longitudinal leaves defining a void about an axis, each said leaf being attached to any adjacent leaf on at least one end, said leaves being deformable out from said axis, and said plurality of leaves receiving in one end of said void said distal end of said body;
wherein said at least one stop maintains said distal end of said body in said void.

18. A bolt anchor comprising:
a body comprising an axial bore and threads disposed therein, the body terminating at opposing ends, said opposing ends being a larger, proximal end, and a smaller, distal end; and
generally tapering from said proximal end toward said distal end;
at least one stop depending from said body from near said distal end;
a plurality of parallel longitudinal leaves defining a void about an axis, said leaves being maintained around said void about said axis by a collar, said leaves being deformable out from said axis, and said plurality of leaves receiving in one end of said void said distal end of said body;
wherein said at least one stop maintains distal end of said body in said void.

* * * * *